Nov. 17, 1931.  W. D. BREWSTER  1,832,805
RATCHET ACTION FOR CAR BRAKE OPERATING MECHANISM
Filed March 5, 1928  2 Sheets-Sheet 2
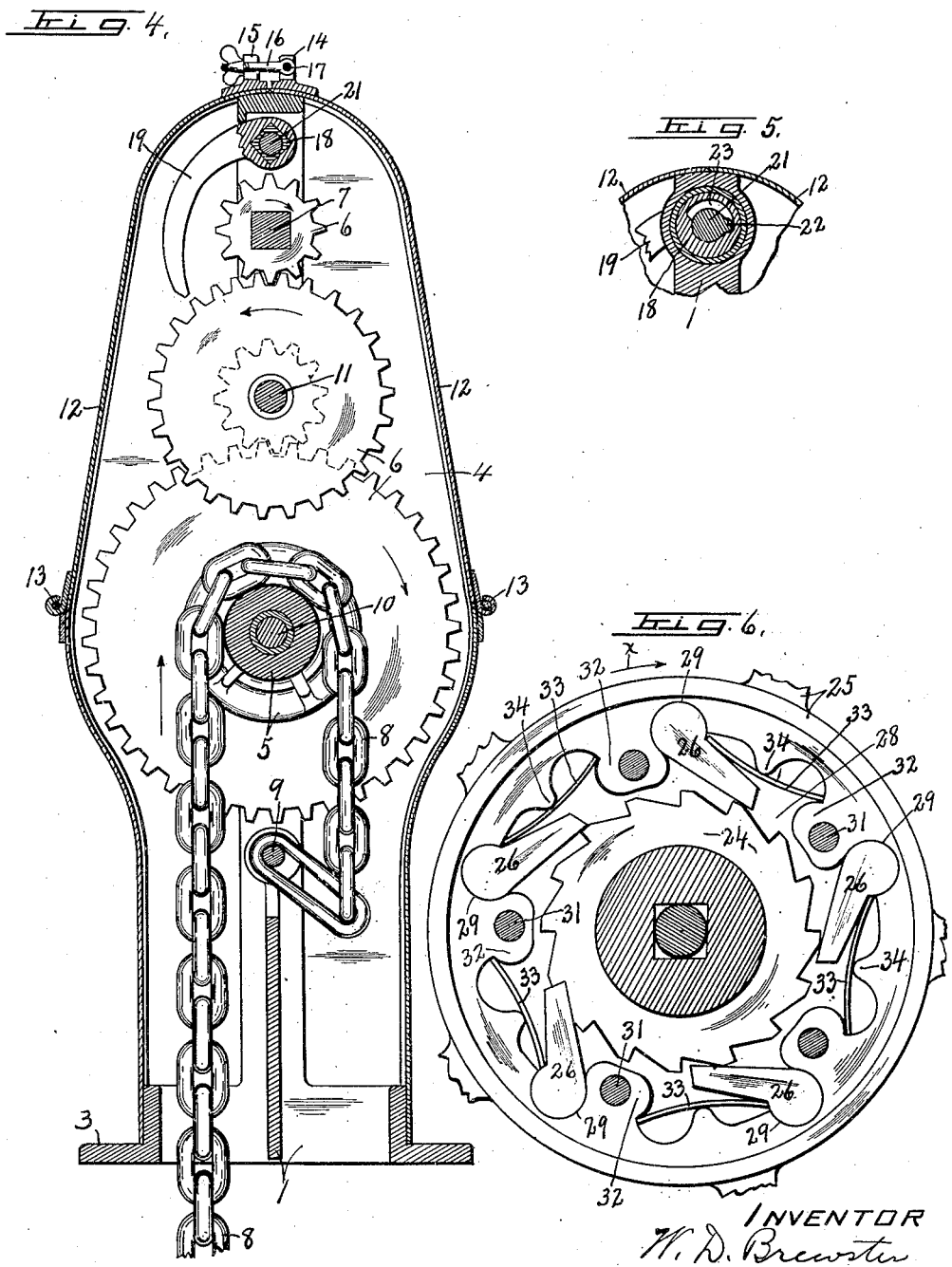

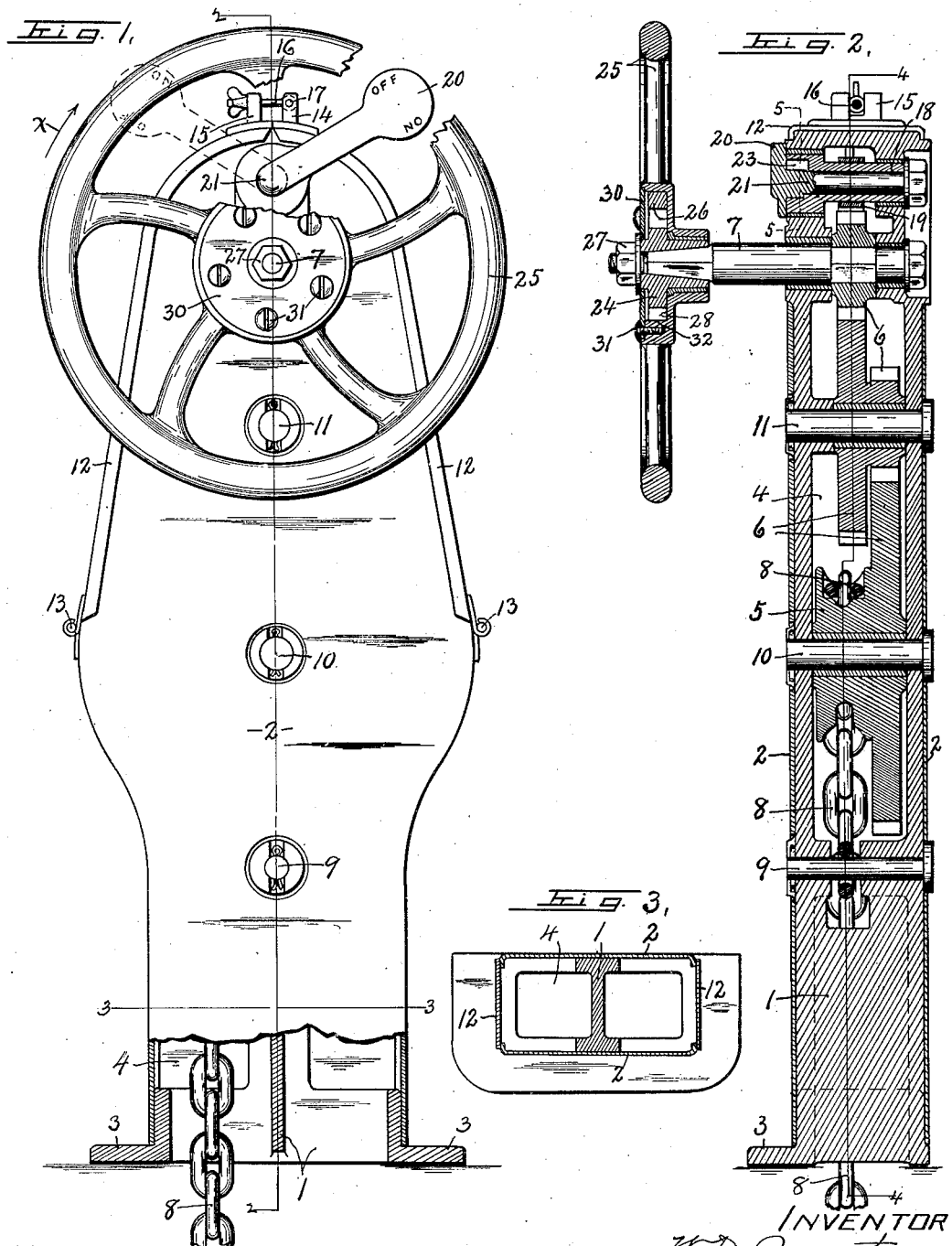

Patented Nov. 17, 1931

1,832,805

UNITED STATES PATENT OFFICE

WILLIAM D. BREWSTER, OF SYRACUSE, NEW YORK, ASSIGNOR TO NATIONAL BRAKE COMPANY INCORPORATED, OF BUFFALO, NEW YORK, A CORPORATION OF NEW YORK

RATCHET ACTION FOR CAR BRAKE-OPERATING MECHANISM

Application filed March 5, 1928. Serial No. 259,162.

This invention relates to a ratchet action for car brake operating mechanism of the class set forth in my Patent No. 1,487,531, March 18, 1924.

The drum with which the brake operating cable is engaged is operatively connected to a primary driving shaft through the medium of speed-reducing and power-increasing train of gears, all rotating about parallel axes and preferably in planes one above the other, the primary shaft being adapted to be operated by a hand wheel through the medium of a ratchet and pawl action capable of rotating the train of gears when the hand wheel is turned in one direction for tensioning the cable to apply the brakes but permitting free rotary movement of the hand wheel in the opposite direction independently of the ratchet wheel.

The main object is to enable the operator to apply the brakes with a minimum angular movement and also with a minimum loss of motion of the operating wheel and furthermore to prevent excessive spinning of the hand wheel when its movement is reversed by the release of the brake-operating mechanism.

One of the specific objects is to establish turning connection between the hand wheel and primary shaft through the medium of a ratchet wheel and a multiplicity of pawls pivotally mounted upon the hand wheel in uniformly spaced relation circumferentially to overlap progressively increasing distances upon adjacent ratchet teeth so that successive pawls may be brought into engagement with the ratchet teeth one at a time with only slight angular movement of the hand wheel in a reverse direction from its brake-applying motion.

A further object is to hold the pawls in operative engagement with the teeth of the ratchet wheel by means of springs of sufficient tension to cause the pawls to drag upon said teeth and thereby to retard or prevent the backward spinning motion of the hand-wheel and pawls when the brakes are released.

Other objects and uses relating to specific parts of the device will be brought out in the following description.

In the drawings:—

Figure 1 is a face view, partly broken away and partly in section, of a brake-operating mechanism embodying the various features of my invention, the holding pawl for the gear train being shown by full lines in its "Off" position and by dotted lines in its "On" position.

Figure 2 is a vertical sectional view taken in the plane of line 2—2, Figure 1.

Figure 3 is a horizontal sectional view taken in the plane of line 3—3, Figure 1.

Figure 4 is a vertical sectional view, taken in the plane of line 4—4, Figure 2.

Figure 5 is a detail vertical sectional view taken in the plane of line 5—5, Figure 2, showing more particularly the bearing for the holding pawl or detent for the gear train.

Figure 6 is an enlarged face view of the central portion or hub of the hand wheel with the outer end plate removed to show the relative position of the several pawls and their actuating springs.

As illustrated, this device comprises an upright cast metal frame or standard —1— engaged in a pressed steel casing —2— except that its base is provided with laterally projecting flanges or feet —3— adapted to rest upon the floor of the car or other available support.

The major portion of the cast metal frame —1— beween the base and top thereof is cored out to form an interior chamber —4— extending through opposite sides thereof but normally closed by the adjacent sides of the steel casing —2— for receiving and inclosing a cable supporting drum —5— and a suitable train of speed reducing and power multiplying gears —6— connecting the cable supporting drum —5— with a primary operating shaft —7— as shown more clearly in Figures 2 and 4.

A chain or cable —8— is mounted upon the drum —5— to be operated thereby and has one end connected to a suitable anchorage —9— on the frame —1— and its other end adapted to be connected to a brake mechanism, not shown, for applying and releasing the brake.

The drum —5— and its coaxial gear of the train are mounted upon a cross shaft —10— while the intermediate gears of the train are similarly mounted upon an intermediate cross shaft —11—, said cross shafts and anchor pin —9— being mounted in suitable openings or bearings in the frame —1— to extend through registering openings in the steel casing or housing —2— as shown in Figure 2 to permit them to be removed when necessary for repairs or replacements of the gears or drum without removing the casing fom the frame or disturbing other parts of the apparatus.

For this latter purpose the opposite sides of the upper portion of the case or housing —2— are provided with movable sections —12—hinged at their lower ends at —13— to the underlying portions of the casing and have their upper ends provided with lugs —14— and —15— for receiving a clamping bolt —16— which is hinged at —17— to one of the lugs —14— and has its other end movable into and out of a slot in the other lug to permit quick clamping and releasing of the sections —12— in and from their closed positions and, when opened, to permit access to the drum —5— and to the gears of the train —6—, it being understood that the sections —12—, when closed, are brought close together over the top of the frame —1—, as shown more clearly in Figures 1 and 4.

A tubular cross sleeve —18— is journaled in suitable bearings in the front and rear sides of the frame —1— above the gear-operating shaft —7— and is provided with an angular intermediate portion for receiving the hub of a holding pawl or detent —19—, Figure 4, said hub being provided with an angular opening corresponding to the angular form of the sleeve —18— to permit the pawl to turn with the sleeve.

This pawl —19— extends circumferentially across the perimeter of the uppermost pinion of the gear train at one side thereof and is movable into and out of engagement with the teeth of the next adjacent gear for holding the gear train against return movement after being operated to set the brakes or, when shifted to its release position, permits the reverse operation of the gear train for releasing the brake.

The means for operating the pawl —19— comprises, in this instance, a weighted hand lever —20— secured to one end of a cross shaft —21—which is journaled in the tubular sleeve —18— coaxial therewith and is provided near its outer end with a key or fin —22— which is movable in a segmental circular groove —23— in the outer enlarged end of the sleeve —18— as shown in Figures 2 and 5.

The hand lever —20— constitutes a crank arm on the outer end of the shaft —21— where it is accessible for operation at any time and has its outer end weighted to hold it in its different positions of adjustment as shown by full lines and also by dotted lines in Figure 1. The weighted end of the lever —20— is provided with indicia such as "Off" and "On" stamped or otherwise impressed thereon to indicate the position of the pawl —19—.

The fin —22— on the rock shaft —21— and ends of the slot or groove —23— are so relatively arranged that when the weighted end of the lever —20— is thrown by hand to one side of a vertical position it will automatically hold the pawl —19— out of engagement with its companion gear and when thrown to the other side of the vertical position the fin —22— will be brought into engagement with the corresponding end of the slot or groove —23— to rock the sleeve —18— and pawl —19— carried thereby into position to disengage the pawl from the gear train for releasing the brake. That is, when the lever —20— is rocked to the opposite side of the vertical position as shown by dotted lines in Figure 1 the fin —22— engages the other end wall of the slot —23— to rock the shaft in the opposite direction for engaging the pawl —19— with the adjacent gear for holding the brake in its applied position.

*Hand wheel and ratchet action*

The gear operating shaft —7— is journaled in suitable bearings in the frame —1— parallel with the axes of the several gears —6— and rock shaft —21— to project forwardly some distance beyond the adjacent side of the frame for receiving and supporting a ratchet wheel —24— and a hand wheel —25— carrying a multiplicity of, in this instance five, pawls —26— for engaging the teeth of the ratchet wheel —24—.

The hub of the ratchet wheel —24— is provided with a tapered socket for receiving a correspondingly tapered outer end of the shaft —7— which is provided with a threaded outer end engaged by a nut —27— for tightly clamping the ratchet wheel upon the shaft so that both may rotate in unison.

The hand wheel —25— is journaled upon the inwardly extending end of the hub of the ratchet wheel —24— and has the central portion of its outer end chambered to receive said ratchet wheel and pawls —26—.

The ratchet wheel is provided with a greater number of uniform teeth than the number of pawls —26—, but not a multiple of the number of pawls so that the latter may be made of uniform construction and still be able to overlap progressively increasing distances upon adjacent teeth without engaging more than one tooth at a time.

When one pawl is engaged with any one of the teeth the remaining pawls will be arranged gradually increasing distances apart circumferentially so that their free ends will overlap progressively increasing distances upon adjacent teeth.

For example, if there are five pawls and one of them is engaged with one of the teeth the next succeeding pawl will be arranged to overlap upon its adjacent tooth one-fifth of the tooth space, the next succeeding pawl two-fifths, the third succeeding pawl three-fifths and the fourth succeeding pawls four-fifths of such tooth space thereby providing for the transmission of motion from the hand wheel to the ratchet wheel with a minimum lost motion.

When rotating the hand wheel in the direction indicated by arrow —x— for transmitting rotary motion to the ratchet wheel and thence through the medium of the gear train for operating the drum —5— and cable —8— to apply the brakes this movement may be limited to a relatively short arc and then reversed, in this instance only one-fifth of the tooth space, to obtain a fresh grip of another pawl with the ratchet wheel for continuing the rotary movement in the direction indicated by the arrow thus providing a close control of the brake in applying the same, it being understood that when the brake is set the pawl-operating member —20— will be shifted to the position shown by dotted lines in Figure 1 for forcing the pawl into engagement with the larger gear —6— on the shaft 11 to hold the brake in its set position.

It will be observed, however, that immediately upon the releasing of the pawl —19— from its holding position by shifting its operating member —20— to the position shown by full lines in Figure 1 the direction of rotation of the ratchet wheel and hand wheel will be reversed.

The hub of the hand wheel —25— is chambered at —28— from its outer end inwardly to receive the ratchet wheel —24— and pawls —26— which are provided with cylindrical outer ends seated in corresponding cylindrical sockets —29— in the outer wall of said chamber, as shown more clearly in Figure 6, the circumferential lengths of the sockets and adjacent ends of the pawls being somewhat greater than a half circle so that when the pawls are placed in operative position they will be held against radial or circumferential displacement.

The outer open end of the chamber —28— is closed by a removable cap or plate —30— which is held in place by clamping screws or bolts —31— and serves to hold the pawls —26— against outward displacement, said bolts being engaged in apertured lugs —32— projecting inwardly from the outer walls of the chamber —28— between the pawls —26—, Figure 6.

The free ends of the pawls are spring pressed into engagement with the teeth of the ratchet wheel —24— by flat leaf springs —33— having one end engaged with the adjacent bosses —32— and their other ends bearing against the outer faces of the pawls while their intermediate portions are adapted to engage adjacent fulcrums —34— on the outer wall of the chamber.

*Operation*

When applying the brake the pawl-operating member —20— will be shifted to the position shown by dotted lines in Figure 1 to bring the free end of the pawl —19— into engagement with the companion gear of the train after which the hand wheel —25— will be rotated clockwise in the direction indicated by arrow —x— thus causing the engaging pawl —26— to effect a corresponding turning movement of the ratchet wheel —24— thereby actuating the gear train and drum to apply the brake.

It is preferable, however, to turn the hand wheel a part of a revolution and then to reverse its motion to engage one of the other pawls with the ratchet wheel during which time the pawl —19— will hold the gear train and drum against return movement.

This alternate clockwise and counter-clockwise movement of the hand wheel may be repeated with the hands in substantially the same position upon the wheel until the brake is properly applied and held in its set position by the pawl —19—.

It will be evident from the foregoing description that as the brake assumes its set position the angular return motion of the hand wheel may be reduced to practically one-fifth of a tooth space in order to obtain successive gripping engagement of the pawls —26— with the ratchet wheel —24—.

On the other hand, when it is desired to release the brake pawl —19— may be tripped from its holding position through the medium of the hand lever —20— whereupon the motion of the gear train and drum will be reversed thus causing a similar reversal of movement of the ratchet wheel —24— and hand wheel —25— by reason of the engagement of one of the pawls with the teeth of the ratchet wheel.

The momentum of this reverse movement of the hand wheel tends to cause the latter to spin counter-clockwise around the ratchet wheel but owing to the pressure of the pawls against the teeth of the ratchet wheel by the springs —33— this pressure acts as a drag upon the ratchet wheel to retard the counter-clockwise spinning movement of the hand wheel which, of course, is desirable in brake operating mechanisms of this character.

It will be observed that practically all of the moving parts, except the hand wheel and adjacent portion of the shaft —7—, are inclosed in a protective housing, but access may be had to the interior mechanism at any time for repairs or adjustments by simply opening one or the other of the movable sections —12— of the casing.

The upper gear —6— of the train on the shaft —7— is provided with an angular opening therethrough for receiving the adjacent corresponding angular portion of the shaft, as shown in Figures 2 and 4, thereby assuring a positive drive of the gear train from the shaft when rotated by the hand wheel —25—.

What I claim is:—

A car brake operating mechanism including a rotary shaft, a ratchet wheel secured to the shaft and provided with a hub extending axially from one end, a hand wheel journaled at one end on said hub and its other end chambered to receive the ratchet wheel and provided with cylindrical sockets in the peripheral walls of the chamber, pawls within said chamber having cylindrical outer ends journaled in said sockets, and leaf springs for yieldingly holding the inner ends of the pawls against the ratchet teeth, each spring having its opposite ends engaged respectively with the corresponding pawl and with the peripheral wall of the chamber in the hand wheel, said wheel having inwardly projecting fulcrums engaging the intermediate portions of the springs and normally bowing the same inwardly to place the springs under tension.

In witness whereof I have hereunto set my hand this 20th day of February 1928.

WILLIAM D. BREWSTER.